United States Patent [19]

Maemori

[11] 4,353,627
[45] Oct. 12, 1982

[54] OVER-HEAD PROJECTOR WITH PARTIAL PROJECTION DEVICE

[75] Inventor: Takashi Maemori, Tokyo, Japan

[73] Assignee: Fuji Photo Film Co., Ltd., Kanagawa, Japan

[21] Appl. No.: 194,827

[22] Filed: Oct. 7, 1980

[30] Foreign Application Priority Data

Oct. 11, 1979 [JP] Japan .......................... 54-140699[U]

[51] Int. Cl.³ .......................... G03B 1/48; G03B 21/14
[52] U.S. Cl. ........................................ 353/24; 353/96; 353/101; 353/DIG. 3; 353/DIG. 5; 353/DIG. 6
[58] Field of Search ............. 353/24, 98, 101, DIG. 6, 353/DIG. 3, DIG. 5, 96

[56] References Cited

U.S. PATENT DOCUMENTS

2,669,156  2/1954  Fitzgerald .......................... 353/101

Primary Examiner—Steven L. Stephan
Attorney, Agent, or Firm—Pasquale A. Razzano

[57] ABSTRACT

An over head projector has a standard projection lens for projecting the whole view of an original image and a partial projection lens for projecting a part of the original image in enlarged scale. One of the projection lenses is selectively brought to a projection position for projecting the original image onto a projection screen. A stage for supporting the original image is vertically movable and is moved up and down when the projection lens is changed. The selection of the projection lens and the vertical movement of the stage are associated with each other so that the original image is always at a proper position with respect to the focal length of the selected projection lens.

7 Claims, 14 Drawing Figures

OVER-HEAD PROJECTOR WITH PARTIAL PROJECTION DEVICE

BACKGROUND OF THE INVENTION

1. Field of the Invention

This invention relates to an over-head projection with a partial projection device, and more particularly to an over-head projector capable of projecting a part of an original image in enlarged scale.

2. Description of the Prior Art

There have been known two types of partial projection device for an over-head projector, one of which employs a relay lens between the original image on the fixed stage and the projection lens for changing the field of view of the projection lens system, the other employing a platform located above the stage for holding the original image at an elevated level above the stage and a converter lens combined with the projection lens for changing the effective focal length thereof.

The former type of the above-mentioned over-head projector with the relay lens is disadvantageous in that the brightness of the image projected is lowered since the original image is located on the stage and the small area thereof illuminated by the same light source is projected in enlarged scale.

The latter type of the over-head projector with the converter lens is advantageous in that the brightness of the image projected in enlarged scale is not so much lowered. However, this type of projector is disadvantageous in that it requires troublesome operations such as attaching and detaching of the converter lens and the platform.

SUMMARY OF THE INVENTION

It is the primary object of this invention to provide an over-head projector capable of projecting a part of an original image in enlarged scale which can be easily operated and projects the enlarged partial image with high brightness.

The over-head projector in accordance with this invention is characterized in that the stage for supporting an original image is made movable up and down, the projection lens system is made into a selectively employed lens group consisting of a standard projection lens for projecting the whole area of the original image and at least one partial projection lens to be selected for projecting a part of the original image in enlarged scale, and the stage and the selected projection lens are brought to the corresponding positions with a single operation. The partial projection lens may be provided separately from the standard projection lens or may be made into a converter lens to be used in combination with the standard projection lens.

In accordance with this invention, a part of the original image can be projected in enlarged scale by a partial projection lens with high brightness and the stage and the selected projection lens are automatically brought to the corresponding positions with a single operation.

DESCRIPTION OF THE PREFERRED EMBODIMENTS

Figures 1, 2:
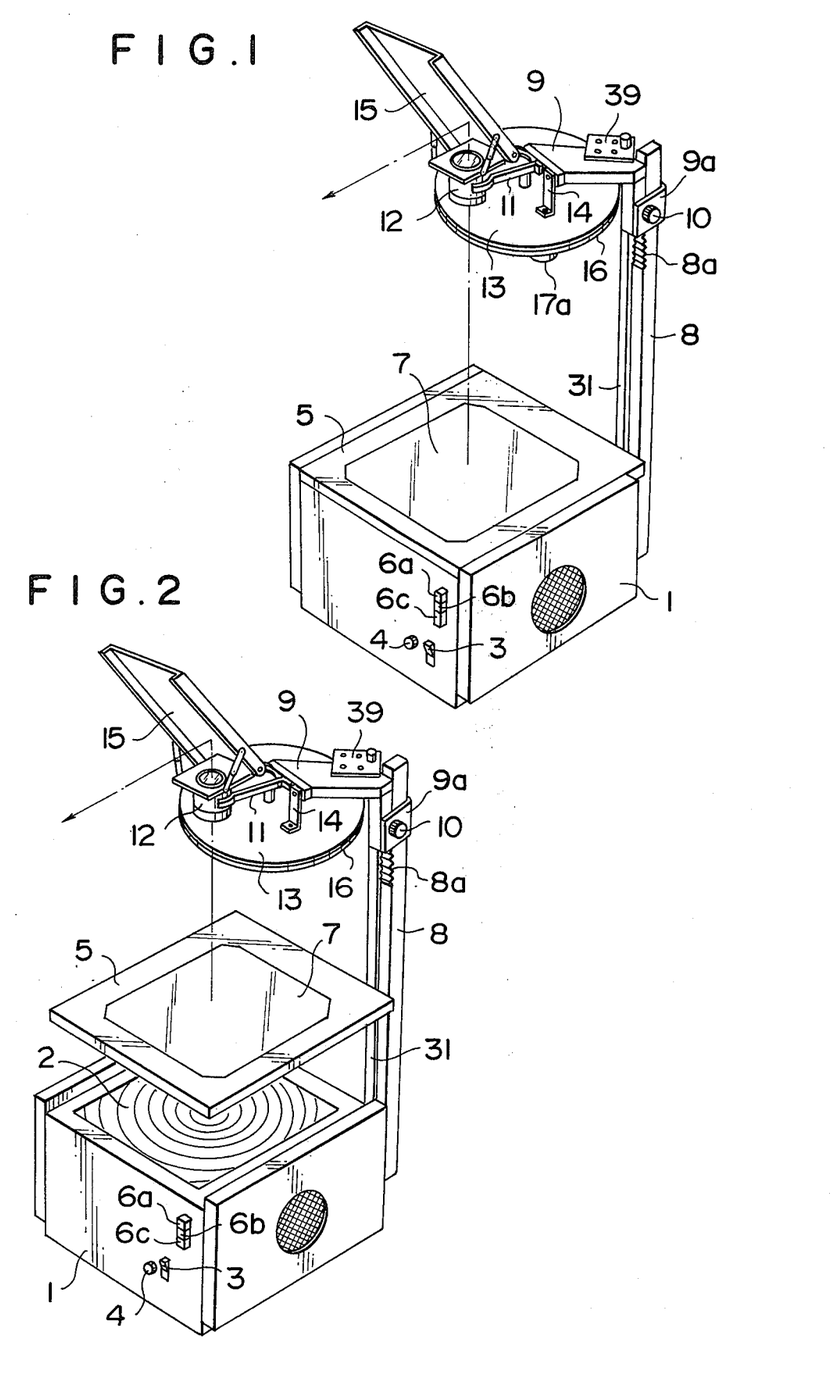
FIG. 1 is a perspective view of an over-head projector in accordance with the first embodiment of this invention.
FIG. 2 is a view similar to FIG. 1 in which the movable stage is elevated.

An embodiment of the over-head projector of this invention is shown in FIGS. 1 to 5. Referring to FIGS. 1 and 2, an over-head projector has a housing 1 which is provided therein with a light source (not shown). A Fresnel lens 2 is provided on the top of the housing 1 for condensing the light from the light source. On the front side face of the housing 1 are disposed a power switch 3, a dial 4 for adjusting the brightness of the light source, and three buttons 6a, 6b and 6c for selectively positioning a stage 5 at one of three predetermined levels.

The stage 5 is made movable up and down above the Fresnel lens 2 on the top of the housing 1. A transparent plate 7 is fixed to a large aperture of the stage 5 of substantially the same size for supporting an original image thereon.

A post 8 is fixed to the back side of the housing supporting a projection lens and a mirror. An arm 9 is fixed to a fixing portion 9a at the upper end of the post 8. The fixing portion 9a includes a gear (not shown) which is meshed with a rack 8a on the post 8. A focus adjusting knob 10 interlocked with the gear is provided on the fixing portion 9a for moving the arm 9 up and down along the post 8.

A lens holder 11 for holding a standard projection lens 12 is secured to the front end of the arm 9. The standard projection lens 12 is mounted on a disc 13 which is held by a holding member 14 fixed to the arm 9. Above the standard projection lens 12 is disposed a foldable mirror 15.

Beneath the disc 13 is rotatably mounted a lens turret 16 which has three lens mount openings 16a. Two converter lenses 17a, 17b of different focal length are mounted in two of the three openings. The converter lenses 17a and 17b of different focal length are selectively combined with the standard projection lens 12 by rotating the turret 16 to project a part of the original image in enlarged scale of different magnifications.

Figure 3:
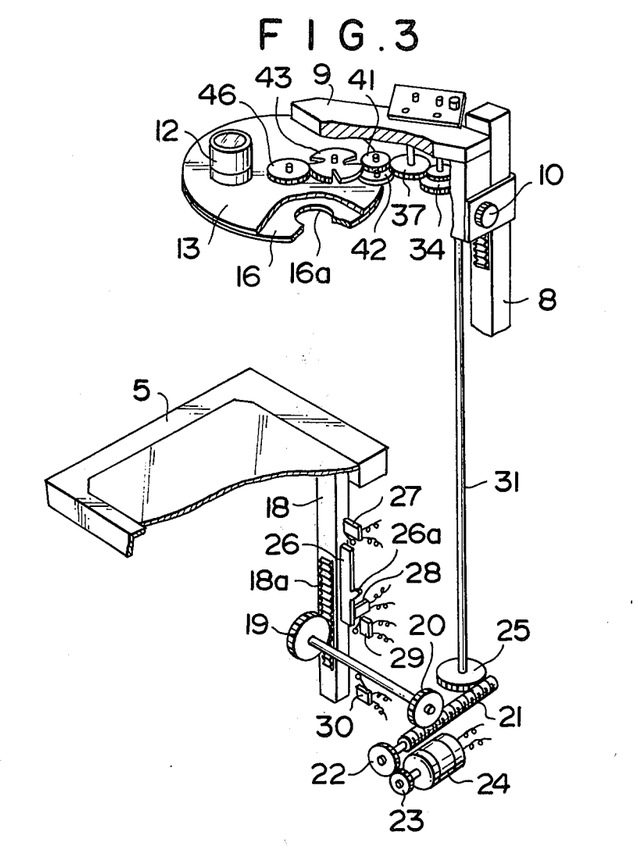
FIG. 3 is a perspective view showing the mechanism for moving the stage and a lens turret employed in the over-head projector in accordance with the first embodiment of this invention.
Figure 4:
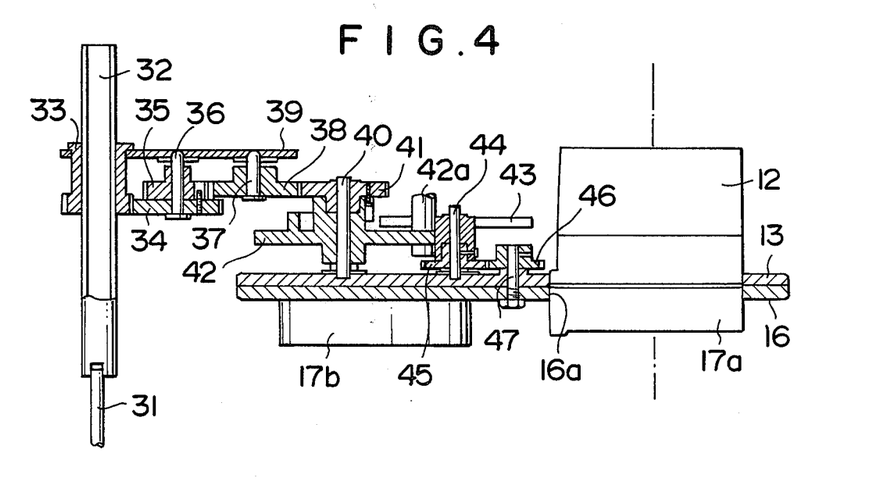
FIG. 4 is a vertical sectional view showing the gear mechanism for rotating the lens turret.

Referring to FIGS. 3 and 4, a vertically extending support 18 is secured to the stage 5 at the top end thereof. On the side face of the support 18 is formed a rack 18a with which a pinion 19 is meshed. A gear 20 is secured to a shaft to which the pinion 19 is fixed. The gear 20 is meshed with a worm 21. The worm 21 is rotated via gears 22 and 23 by a motor 24. Further, a gear 25 for rotating the turret 16 is also meshed with the worm 21.

To the support 18 is affixed a cam 26 having a projecting portion 26a. The cam 26 serves to actuate microswitches 27, 28, 29 and 30 which are provided for detecting the height of the stage 5 when the stage 5 is moved up and down.

The aforementioned gear 25 is secured to the lower end of a rotating shaft 31 to the other end of which a spline shaft 32 is fixed. A gear 33 is slidably mounted on the spline shaft 32. When the spline shaft 32 is rotated, the gear 33 is rotated together therewith, and then a gear 34 meshed with the gear 33 is rotated. A gear 35 is concentrically secured to the gear 34, and accordingly, is rotatable therewith. The gears 34 and 35 are loosely mounted on a shaft 36.

A gear 38 is loosely mounted on a shaft 37, and is meshed with the aforementioned gear 35. The shaft 36 and 37 are secured to a supporting plate 39 fixed to said arm 9. A gear 41 is loosely mounted on a shaft 40 infixed to the disc 13. A rotatable plate 42 which is disposed under the gear 41 and secured thereto serves as a part of a geneba intermittent motion mechanism.

A pin 42a which is infixed to the rotating plate 42 acts to rotate a geneba gear 43 intermittently for 120° per one motion. The geneba gear 43 is loosely fixed to a shaft 44 infixed to the disc 13, and secured to a gear 45 disposed under the gear 43. A gear 46 is meshed with the gear 45, and fixed to a rotatable shaft 47 which is secured to the turret 16 at its lower end. The rotatable shaft 47 extends upward through the center of the disc 13.

Figure 5:
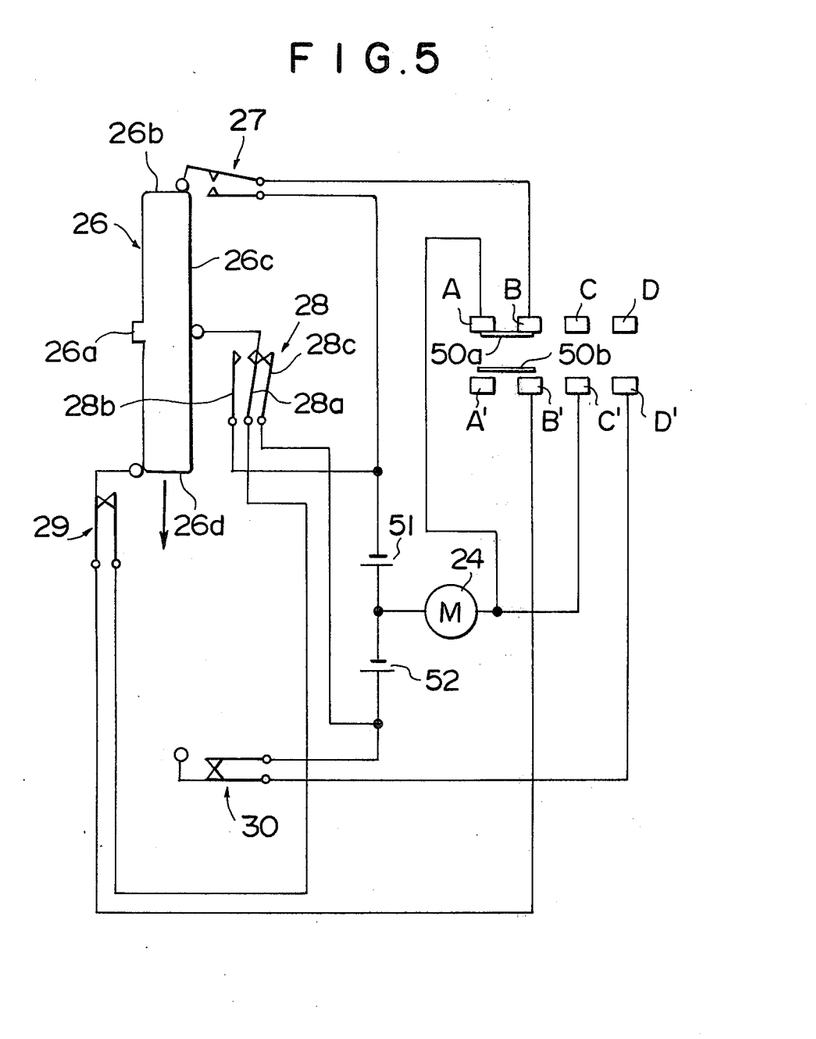
FIG. 5 is a block diagram of a control circuit for a motor employed in the first embodiment.

FIG. 5 is a block diagram of a control circuit for the motor 24. Upon depression of the uppermost button 6a (FIG. 1), a pair of slide members 50a and 50b connect terminal A with B and A' with B'. Upon depression of the middle button 6b, the slide members 50a and 50b connect terminal B with C and B' with C'. Further, upon depression of the lowermost button 6c, the slide members 50a and 50b connect terminal C with D and C' with D'. Two power sources 51 and 52 are connected with the motor 24. One power source 51 supplies electric power to the motor 24 to rotate it in one direction (forward rotation), and the other power source 52 supplies electric power to the motor 24 to rotate it in the opposite direction (reverse rotation). By the forward and reverse rotation of the motor 24, the movable stage 5 is moved up and down.

The microswitch 27 is turned off by the upper end of the cam 26 to detect the uppermost position of the stage 5. The microswitch 28 has a movable contact 28a located between a pair of fixed contacts 28b and 28c to be selectively put into contact therewith. The microswitch 28 serves to determine the direction of rotation of the motor 24 to move up or down the stage 5. The movable contact 28a is actuated by the side face 26c of the cam 26 to be put into contact with the fixed contact 28c when the cam 26 is in its upper position including the uppermost position shown in FIG. 5. When the cam 26 is in its lower position, the movable contact 28a is separated from the fixed contact 28c and put into contact with the other fixed contact 28b. The microswitch 29 is turned off by the projecting portion 26a of the cam 26 when the cam is brought to its middle position. When the cam 26 is moved down to its middle position, the microswitch 29 is turned off by the projecting portion 26a and the movable contact 28a of the microswitch 28 is disengaged from the side face 26c of the cam 26 and changed over from the fixed contact 28c to the fixed contact 28b. The microswitch 30 is turned off by the lower end 26b of the cam 26 to detect the lowermost position of the stage 5.

The microswitches 27, 29 and 30 are vertically spaced so that the microswitches detect the uppermost, the middle and the lowermost positions of the stage 5. As the stage 5 is moved up and down, the turret 16 is rotated to change over the projection lens. In the above embodiment, a driving device such as a motor is used for moving both the stage and the turret. However, it should be noted that the stage and the turret may be provided with respective motors.

The operation of the aforementioned over-head projector in accordance with the first embodiment of the present invention will now be described in detail hereinbelow.

Referring to FIG. 5, when the lowermost button 6c (FIG. 1) is depressed, the slide members 50a and 50b connect the terminal C with D and C' with D', respectively. The motor 24 is supplied with an electric power from the power source 52, and accordingly, is started to rotate reversely to move the stage 5 downward to the lowermost position shown in FIG. 1. Then, when the microswitch 30 is turned off by the lower end 26b of the cam 26, the motor 24 is stopped.

Accompanying the downward movement of the stage 5, the turret 16 is intermittently rotated twice each by 120°. As a result, the opening 16a of the turret 16 which holds no converter lens is aligned with the standard lens 13.

In the standard position where the stage 5 is on the housing 1 as shown in FIG. 1, the original image on the stage 5 is illuminated by the light source within the housing 1 and is projected by the standard lens 12 via the mirror 15 onto a projection screen (not shown).

In case that a part of the original image is projected onto the screen in enlarged scale, the magnification of the projected image can be selected by selectively depressing one of the buttons 6b and 6c on the housing 1.

When the upper (middle) button 6b is depressed at this stage, the slide members 50a and 50b contact the terminal B with B' and C with C'. In this case, the motor 24 is supplied with an electric power from the power source 51 since the movable contact 28a of the microswitch 28 is in contact with the fixed contact 28b. Accordingly, the motor 24 is forwardly rotated to move the stage 5 upward. When the stage 5 is moved upward by one unit length (corresponding to a half length of the cam 26), the microswitch 29 is turned off by the projection portion 26a thereby to stop the motor 24. At the same time, the movable contact 28a is put into contact with the fixed contact 28c. When the stage 5 is moved upward by one unit length, the turret 16 is rotated by 120° in the opposite direction. Thus, as shown in FIG. 4, the converter lens 17a is brought into alignment with the standard projection lens 12 to change the focal length of the projection lens.

As is clear from the above, in the overhead projector in accordance with this invention, when a part of the original image is projected in enlarged scale by a projection lens consisting of the standard lens 12 and the converter lens 17a, the stage 5 supporting the original image 12 is moved upward so that the brightness of the projected image will not fall.

When the uppermost button 6a is depressed, the slide members 50a and 50b connect the terminal A with A' and B with B'. In this case, the motor 24 is supplied with an electric power from the power source 51, and accordingly, the motor 24 is rotated forwardly. Therefore, the stage 5 is moved further upward to its uppermost position. Then, when the microswitch 27 is turned off by the upper end 26b of the cam 26 to stop the motor 24. When the stage is moved upward, the turret 16 is rotated to bring another converter lens 17b into alignment with the standard lens 12. Thus, a part of the original image is projected in largest scale.

In order to move the stage 5 downward by one unit length to the middle position, the middle button 6b is depressed. When the button 6b is depressed, the motor 24 is supplied with an electric power from the power source 52, and accordingly rotated in the reverse direction to move the stage 5 downward until the microswitch 29 is turned off by the projecting portion 26a of the cam 26. By depressing the lowermost button 6c, the stage 5 can be further moved downward to the lowermost position on the stage 5.

Figures 6, 7:
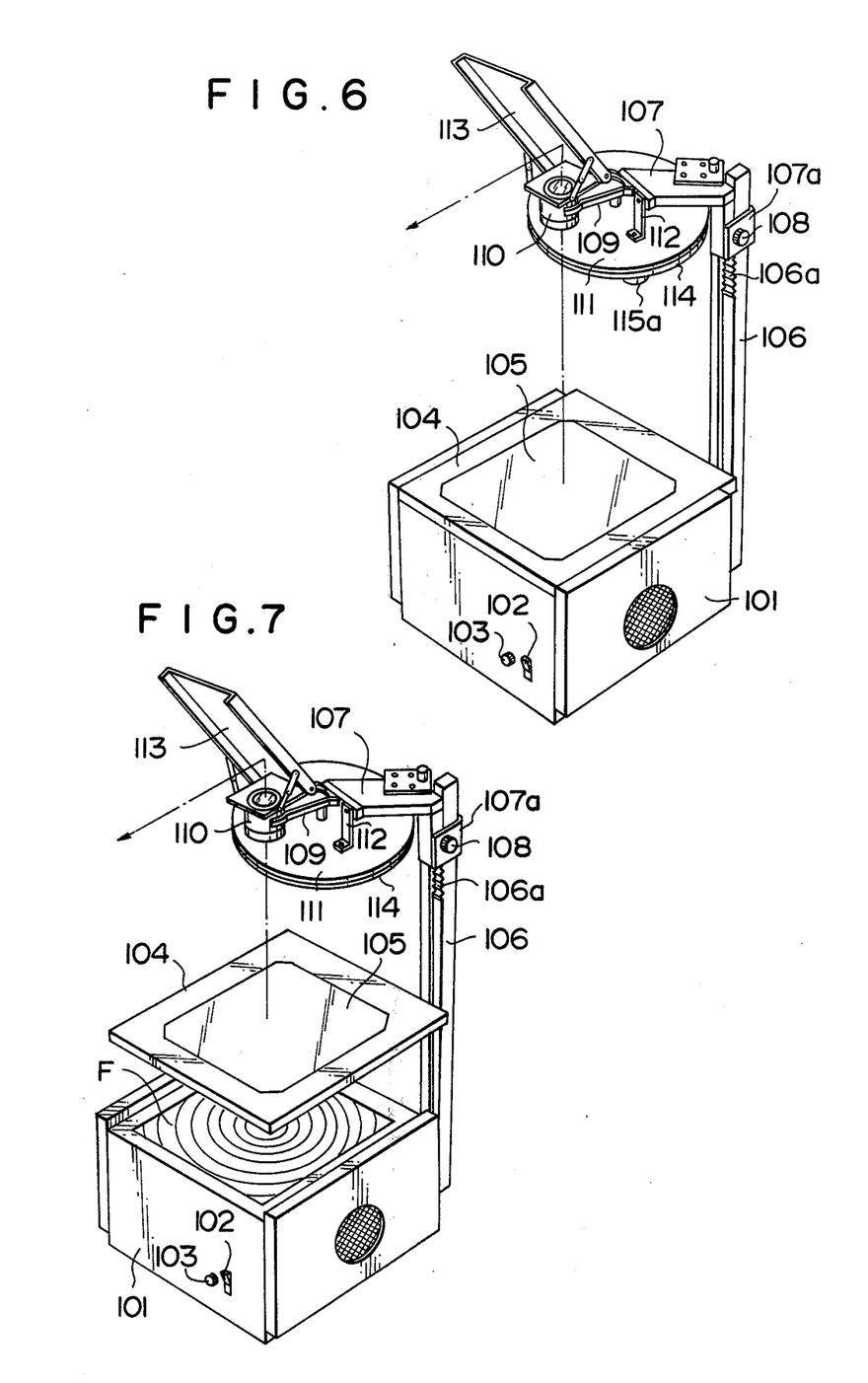
FIG. 6 is a perspective view of an over-head projector in accordance with the second embodiment of this invention.
FIG. 7 is a view similar to FIG. 6 in which the movable stage is elevated.

Another embodiment of this invention is shown in FIGS. 6 to 12. Referring to FIGS. 6 and 7, the overhead projector of this embodiment has a housing 101 which is provided therein with a light source (not shown). A Fresnel lens F is provided on the top of the housing 101 for condensing the light from the light source. On the front side face of the housing 101 are disposed a power switch 102 and a dial 103 for adjusting the brightness of the light source.

The stage 104 is made movable up and down above the Fresnel lens F on the housing 101. A transparent plate 105 is fixed to a large aperture of the stage 5 of substantially the same size for supporting an original image thereon.

A post 106 is fixed to the back side of the housing 101 for supporting a projection lens and a mirror. An arm 107 is fixed to a fixing portion 107a at the upper end of the post 106. The fixing portion 107a includes a gear (not shown) which is meshed with a rack 106a on the post 106. A focus adjusting knob 108 interlocked with the gear is provided on the fixing portion 107a for moving the arm 107 up and down along the post 106.

A lens holder 109 for holding a standard projection lens 110 is secured to the front end of the arm 107. The standard projection lens 110 is mounted on a disc 111 which is held by a holding member 112 fixed on the arm 107. Above the standard projection lens 110 is disposed a foldable mirror 113.

Beneath the disc 111 is rotatably mounted a lens turret 114 which has three lens mount openings. The lens turret 114 is manually rotated to select a desired projection lens. Two converter lenses 115a, 115b of different focal length are mounted in two of the three openings. The converter lenses 115a and 115b of different focal length are selectively combined with the standard projection lens 110 by rotating the turret 111 to project a part of the original image in enlarged scale of different magnifications.

Figures 8, 9, 10:
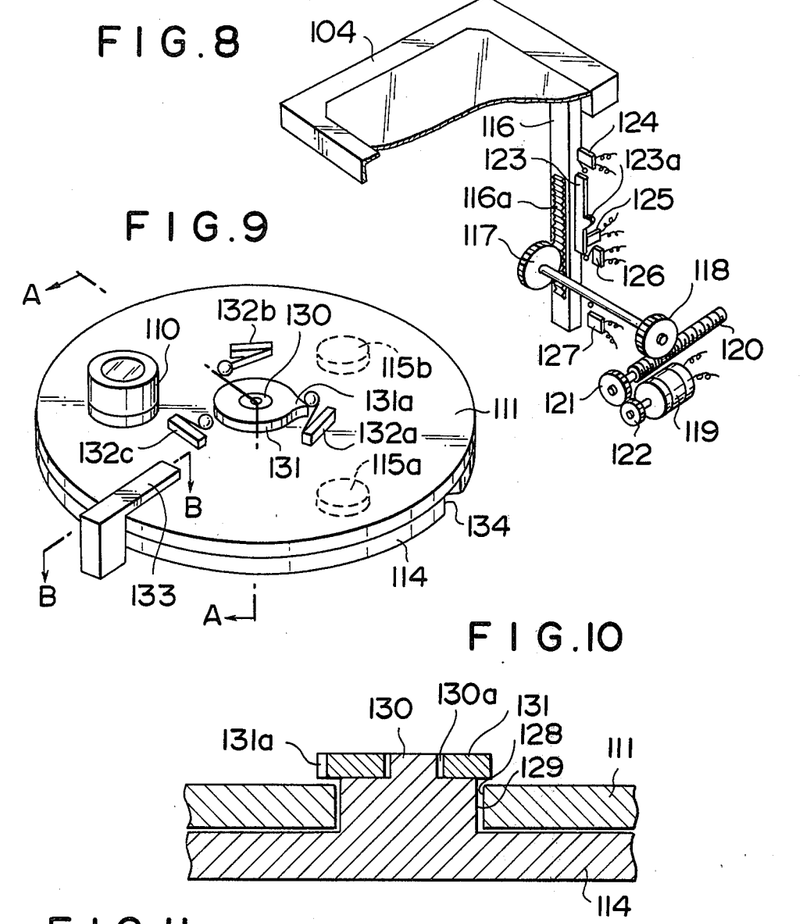
FIG. 8 is a perspective view illustrating the mechanism for moving the stage up and down in the second embodiment.
FIG. 9 is an enlarged perspective view of a disc which holds the standard projection lens adjacent the lens turret in the second embodiment.
FIG. 10 is a fragmentary enlarged vertical sectional view of a part of the disc and the lens turret taken along the line A—A of FIG. 9.

Referring to FIG. 8, a vertically extending support 116 is secured to the stage 104 at the top end thereof. On the side face of the support 116 is formed a rack 116 with which a pinion 117 is meshed. A gear 118 is secured to a shaft to which the pinion 117 is fixed. The gear 118 is meshed with a worm 120. The worm 120 is rotated by a motor 119, via gears 121 and 122.

To the support 116 is affixed a cam 123 having a projecting portion 123a. The cam 123 serves to actuate microswitches 124, 125, 126 and 127 which are provided for detecting the height of the stage 104 when the stage 104 is moved up and down.

Referring to FIGS. 9 and 10, there is formed a circular opening 128 (FIG. 10) in the central portion of the disc 111. A projected circular portion 129 which is integrally provided on the central portion of the turret 114 extends through the opening 128. The projected circular portion 129 has a shaft portion 130 at its top at the center thereof. The shaft portion 130 has a thread 130a on the periphery thereof. A cam plate 131 with a projecting portion 131a is fixed to the thread 130a of the shaft portion 130. Three normally opened microswitches 132a, 132b and 132c are provided around the cam plate 131 on the turret 114 and are selectively turned on (closed) by the projecting portion 131a when the cam plate 131 is rotated together with the turret 114 to bring one of the lens mounting openings of the turret 114 into alignment with the standard lens 110. Upon turning on one of the microswitches, the motor 119 is rotated to move the stage 104 up or down.

Figure 11:
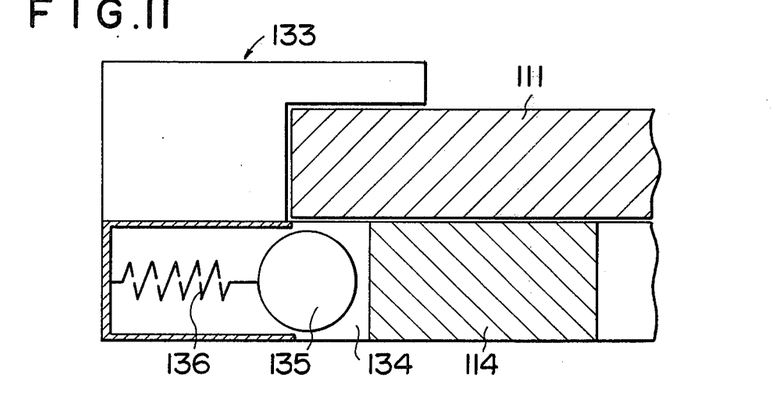
FIG. 11 is an enlarged partial sectional view of the disc and the lens turret taken along the line B—B of FIG. 9.

As shown in FIGS. 9 and 11, a locking device 133 may be provided adjacent the periphery of the turret 114 for locking the turret 114 in predetermined positions wherein one of the lens mounting openings of the turret is aligned with the standard lens 110. The locking device 133 comprises three cut-off portions 134 formed on the periphery of the turret 114 and a spring-biased ball 135 to be spring engaged in one of the cut-off portions 134. The ball 135 is spring-biased radially onto the periphery of the turret 114 to be urged in the cut-off portion 134 by means of a spring 136. There may be provided a friction means between the disc 111 and the turret 114 or between the disc 111 and the cam plate 132 so as to prevent over run of the turret 114 when the turret 114 is rotated to be locked at the desired position.

Figure 12:
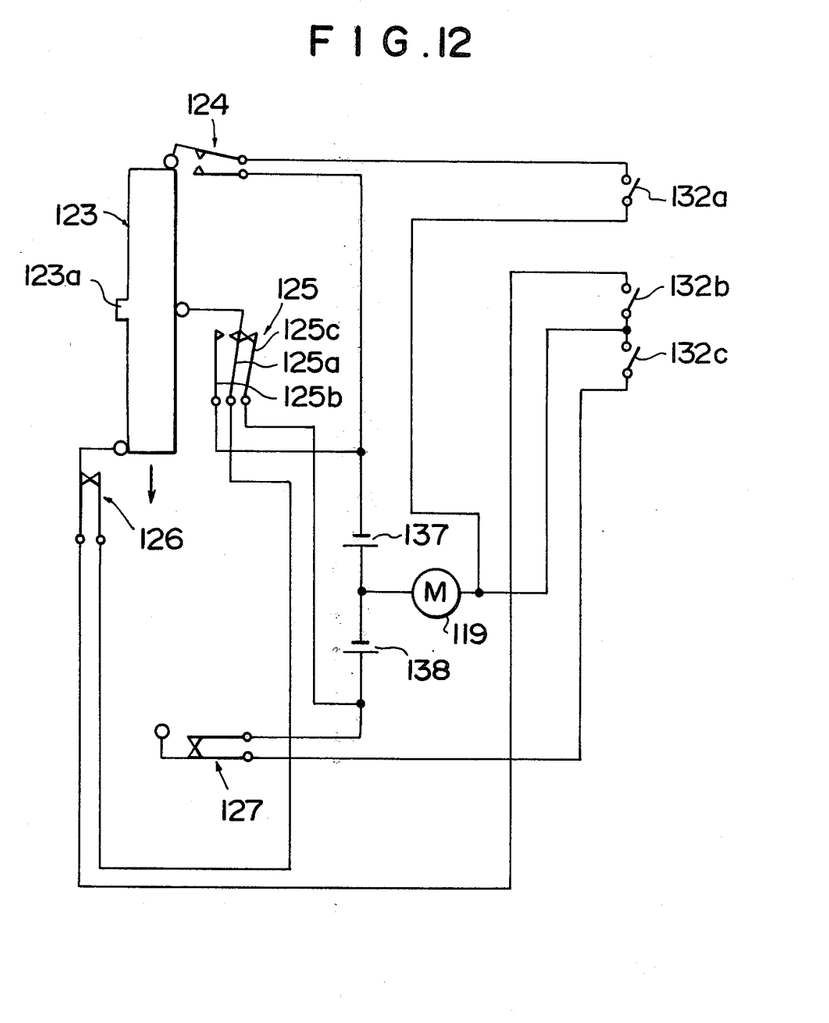
FIG. 12 is a block diagram of a control circuit for a motor employed in the second embodiment.

FIG. 12 is a block diagram of a control circuit for the motor 119. When the turret 114 is manually rotated to bring one of the three lens mounting openings of the turret 114 into alignment with the standard lens 110, one of the microswitches 132a, 132b and 132c is turned on by the projecting portion 131a of the cam plate 131.

The motor 119 is supplied with an electric power from a power source 137 or 138 to be rotated forwardly or reversely. By the forward rotation of the motor 119, the stage 104 is moved upward and vice versa. Similarly to the control circuit shown in FIG. 5, the microswitch 124 is turned off by the upper end of the cam 123 to detect the uppermost position of the stage 104. The microswitch 125 has a movable contact 125a and a pair of fixed contacts 125b and 125c. The movable contact 125a is selectively put into contact with the fixed contact segment 125b or 125c. The microswitch 125 serves to determine the direction of rotation of the motor 119 to move up or down the stage 104. The movable contact 125a is put into contact with the fixed contact 125c when the cam 123 is positioned in its uppermost position shown in FIG. 12. When the cam 123 is moved down and turns off the microswitch 126 by the projecting position 123a, the movable contact 125a is changed over from the the fixed contact 125c to the fixed contact 125b. The microswitch 127 is turned off by the lower end of the cam 123 to detect the lowermost position of the stage 104.

The microswitches 124, 126 and 127 are vertically spaced from one another along the longitudinal direction of the cam 123 so that the microswitches detect the three vertical positions of the stage 104.

The operation of the aforementioned over-head projector in accordance with the second embodiment of this invention will be described in detail hereinbelow.

Referring to FIG. 12, when the microswitch 132c is closed, the motor 119 is supplied with an electric power from the power source 138, and accordingly, is started to be reversely rotated to move the stage 104 downward to the lowermost position shown in FIG. 6. Then, when the microswitch 127 is turned off by the lower end of the cam 123, the motor 119 is stopped.

When the stage 104 is in the lowermost position as shown in FIG. 6, the original image on the stage 104 is illuminated by light from the light source within the housing 101. The illuminated original image is projected onto a projection screen (not shown) by the standard lens 110 via the mirror 113.

When a part of the original image is to be projected onto the screen in enlarged scale, the magnification can be selected by manually rotating the turret 114.

When the converter lens 115a is aligned with the standard lens 110, the microswitch 132b is closed, and the movable contact 125a of the microswitch 125 is put into contact with the fixed contact 125b so that the motor 119 is supplied with an electric power from the power source 137. Accordingly, the motor 119 is forwardly rotated to move the stage 104 upward. When the stage 104 is moved up by one unit length (corresponding to the half length of the cam 123), the microswitch 126 is turned off by the projecting portion 123a to stop the motor 119. At the same time, the movable contact 125a is changed over from the fixed contact 125b to the fixed contact 125c.

As is clear from the above, in the over-head projector in accordance with the second embodiment of this invention, too, when a part of the original image is projected in enlarged scale by a projection lens consisting of the standard lens 110 and the converter lens 115a, the stage 104 supporting the original image is moved upward so that the brightness of the projected image will not fall.

When the converter lens 115b is put into alignment with the standard lens 110 and the microswitch 132a is closed, the motor 119 is supplied with an electric power from the power source 137 so that the motor 119 is forwardly rotated and the stage 104 is moved upward to its uppermost position. Then, when the microswitch 124 is turned off by the upper end of the cam 132, the motor 119 is stopped.

As described above, in the over-head projector in accordance with the second embodiment of this invention, when a projection lens is selected from the projection lens group by manually rotating the lens turret 114, the stage 104 is automatically brought to a right position corresponding to the selected projection lens.

Figure 13:
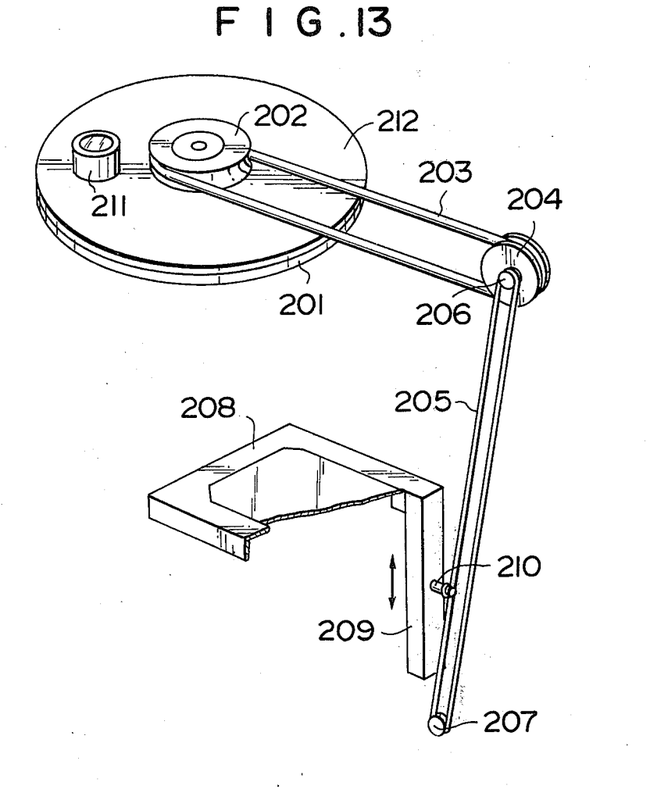
FIG. 13 is a perspective view showing the mechanism for moving the stage and the lens turret together in the over-head projector in accordance with the third embodiment of the present invention, and, FIG. 14 is a perspective view of a slide plate which can be used instead of the lens turret in any one of the above embodiments of this invention.

Still another embodiment of the present invention is shown in FIG. 13. The overhead projector in accordance with this embodiment is similar to the one of the first and second embodiments except for the mechanism which connects the lens turret with the stage. FIG. 13 shows the essential portion of the overhead projector in accordance with this embodiment.

In this embodiment, there is provided a wire pulley 202 fixed to a lens turret 201 instead of the cam plate 131 in the second embodiment. An endless wire 203 runs around the wire pulley 202 and an idler pulley 204. Another endless wire 205 runs around a pulley 206 fixed to the idler pulley 204 and still another pulley 207 disposed under the pulley 206. The pulleys 206 and 207 are located vertically spaced apart so that the endless wire 205 extends and runs vertically.

The stage 208 corresponding to the stage 104 in the second embodiment has a vertically extending post 209 which has a connecting member 210 engaged with a part of the wire 205. Thus, the turret 201 and the stage 208 are associated with each other so that one is automatically moved by manually moving the other. The diameter of each of the pulleys 202, 204, 206 and 207 is so selected that when the turret 201 is rotated by 120° to bring one of a plurality of converter lens mounting openings (not shown) into alignment with the standard lens 211 on a fixed disc 212, the stage 208 is automatically moved up or down by said one unit length to change the projection lens.

Figure 14:
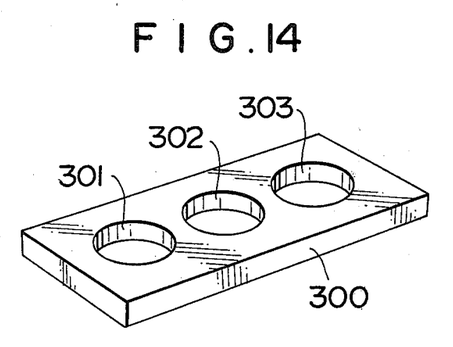

A disc-shaped turret is used as a converter lens holder in the above three embodiments, but a horizontally movable slide plate 300 may be used instead thereof. FIG. 14 is a perspective view illustrating an example of the slide plate 300. The slide plate 300 has two lens mounting openings 301 and 302 for supporting two converter lenses of different focal length and one opening 303 for a standard lens. The opening 303 is not necessary if the slide plate 300 is made small and is taken away from the optical path when the standard lens is used.

I claim:

1. An overhead projector capable of projecting at least a part of an original image in enlarged scale comprising a vertically movable stage for supporting an original transparent image thereon and movable from a normal, lowered position wherein said stage supports said original image for normal projection to at least one raised position for projection of a part of said image in enlarged scale; projection lens group means carrying a plurality of lenses each corresponding with a respective one of said lowered and raised positions of said vertically movable stage, said lenses including a standard lens for projecting the entire original image when said stage is at its lowered position and at least one partial projection lens for projecting a part of the original image when said stage is at a respective raised position thereof; automatic projection lens selecting means for automatically selecting one of the lenses of said projection lens group for according to the respective position of the stage; stage moving means for moving said stage between its raised and lowered positions; and mechanical linkage means associating said lens selecting means with said stage moving means so that the position of the stage and the projection lens selected by the lens selecting means automatically correspond correctly with each other for each said vertical position of said stage.

2. An overhead projector as defined in claim 1 in which said partial projection lens is a combination of said standard lens and a converter lens.

3. An overhead projector as defined in claim 1 in which said stage moving means comprises a motor for moving the stage up and down and means for stopping the motor when the stage in moved to a desired position.

4. An overhead projector capable of projecting at least a part of an original image in enlarged scale, comprising a vertically movable stage for supporting an original transparent image thereon and vertically movable between a normal, lowered position wherein said stage supports said original image for normal projection and at least one raised position wherein said stage supports said image for projection of a part of said image in enlarged scale; projection lens group means including a standard lens for normal projection of the entire original image and at least one partial projection lens for projecting a part of the original image in enlarged scale; lens holding means for holding the projection lenses of said projection lens group; means for moving the lens holding means to a selected position for selecting a particular one of said projection lenses for one of said normal and enlarged-scale projections of said original image; stage moving means for moving said stage up and down to said raised and lowered positions; detecting means for detecting the position of said lens holding means and thereby detecting the lens selected for projection of said image; and stage positioning means for automatically causing said stage moving means to bring said stage to the one of its raised and lowered positions corresponding to the one of the projection lenses detected by said detecting means to be selected for projection of said image.

5. An overhead projector as defined in claim 4 in which said partial projection lens is a combination of said standard lens and a converter lens.

6. An overhead projector as defined in claim 5 in which said lens holding means comprises a standard lens holder for holding said standard lens in a fixed position, and a converter lens holder for holding said converter lens, said converter lens holder being movable between a first position where the converter lens is aligned with the optical axis of the standard lens and a second position where the converter lens is out of alignment with the optical axis of the standard lens.

7. An overhead projector as defined in any one of claims 4, 5, and 6 in which said stage moving means is an electric motor, said detecting means is an electric circuit including a plurality of microswitches, and said stage positioning means stops the motor to stop the stage when the position of the stage is detected by one of said microswitches.

* * * * *